United States Patent

[11] 3,620,664

[72] Inventors Stanley R. Hobart
New Orleans, La.;
Howard H. McGregor, Jr., Cambridge,
Mass.; Charles H. Mack, New Orleans, La.
[21] Appl. No. 18,394
[22] Filed Feb. 27, 1970
[45] Patented Nov. 16, 1971
[73] Assignee **The United States of America as
represented by the Secretary of Agriculture**
Original application Sept, 19, 1967, Ser.
No. 668,974, now Patent No. 3,584,000.
Divided and this application Feb. 27, 1970,
Ser. No. 018,394

[54] PHENYL-N-ARYLCABAMATES AND A PROCESS OF PRODUCING CELLULOSE N-ARYLCARBAMATES THEREFROM
13 Claims, No Drawings

[52] U.S. Cl..................................................... 8/120,
260/224, 260/482 B, 8/DIG. 11, 8/116.2, 8/31,
8/54.2
[51] Int. Cl...................................................... D06m 13/42

[50] Field of Search........................................... 8/116.2,
120, DIG. 11

[56] References Cited
UNITED STATES PATENTS
3,420,696    1/1969    Cotton et al. ..................    8/116.2
OTHER REFERENCES
Hobart et al., Textile Research Journal, 38, 824–830 (1968)
Hobart et al., Textile Research Journal, 39, 317–323 (1969)
Mack et al., Journal of Chemical and Engineering Data, Vol. 14, No. 2, pp. 258–261 (1969)

*Primary Examiner*—George F. Lesmes
*Assistant Examiner*—J. Cannon
*Attorneys*—R. Hoffman and W. Bier

ABSTRACT: Novel phenyl N-arylcarbamates and diphenyl N,N'-arylenedicarbamates are produced. Such componds when applied to cellulosic materials and heated produce isocyanates in situ which in turn react with the cellulose to produce cellulosic materials having improved rot resistance and acid dye affinity.

PHENYL-N-ARYLCARBAMATES AND A PROCESS OF PRODUCING CELLULOSE N-ARYLCARBAMATES THEREFROM

A nonexclusive, irrevocable, royalty-free license in the invention herein described, throughout the world for all purposes of the United States Government, with the power to grant sublicenses for such purposes, is hereby granted to the Government of the United States of America.

The present invention relates to valuable new phenyl N-arylcarbamate esters which are particularly useful as finishing agents for cotton cellulose and to cellulose carbamate esters which impart useful properties to the cellulose.

More particularly, this invention relates to novel phenyl N-arylcarbamates, diphenyl N,N'-arylenedicarbamates, cellulose N-arylcarbamates and cellulose N,N'-arylenedicarbamates and the process for making them. Phenyl N-arylcarbamates and diphenyl N,N'-arylenedicarbamates possess the following respective structures:

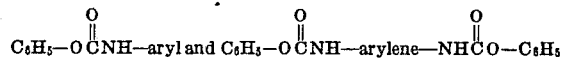

in which aryl represents phenyl, substituted phenyl, naphthyl, 2,3 and 4-pyridyl, biphenyl, and the like and arylene represents ortho, meta, and para-phenylene, substituted ortho, meta and para-phenylene, ortho, meta and para-pyridylene and the like. Phenyl N-arylcarbamates and diphenyl N,N'-arylene-dicarbamates are prepared by the reaction of the aryl amine or arylene diamine with phenyl chloroformate in the presence of an acid acceptor. Phenyl N-arylcarbamates and diphenyl arylenedicarbamates can also be prepared from the aryl isocyanate or arylene diisocyanate and phenol. Phenyl N-arylcarbamates and diphenyl N,N'-arylenedicarbamates are well known to be aryl isocyanate and arylene diisocyanate generators when heated since phenol or the phenoxide ion is a good leaving group in this type of elimination or substitution reaction. It is also well known that the substituent groups on the aryl or arylene moiety have a pronounced effect on the relative ease with which the carbamate frees the isocyanate. Although it was not specifically investigated relative to this invention, other good leaving groups in addition to phenol can be used for the production of isocyanate generators.

It is the object of this invention to provide novel phenyl N-arylcarbamates and diphenyl N,N'-arylenedicarbamates which are valuable and useful as isocyanate generators in that the isocyanates are generated in situ in the presence of cotton cellulose via a thermal treatment. It is a further object of this invention to provide a novel method for the production of aryl and arylene carbamylated celluloses. It is a still further object of this invention to provide novel cellulose N-aryl carbamates and cellulose N,N'-arylenedicarbamates which are useful in addition to other things as rot resistant and cross-linking treatments, respectively.

The above and other objects will become apparent in the course of the following description and the appended claims.

The phenyl N-arylcarbamates have the following structures:

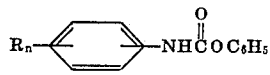

where R is alkyl, alkoxyl, hydroxyl, thioalkyl, and dialkylamino, and n is 1, 2, and 3;

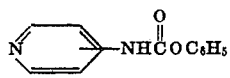

where the point of attachment to the pyridine ring is in the 2, 3, and 4 position; and

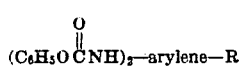

where R is hydrogen, hydroxyl, alkyl, alkoxyl, and dialkylamino and arylene is phenylene, biphenylene, oxy-bis-phenylene, and methylene bis-phenylene. In the presence of a base to act as hydrogen chloride acceptor, phenyl N-arylcarbamates are produced by the action of phenyl chloroformate on an aryl amine, such as

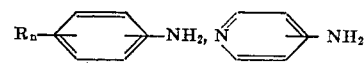

and (NH$_2$)$_2$-arylene-R, where R, n, arylene and pyridyl attachments are the same as those listed above. All of the phenyl N-arylcarbamates can theoretically be prepared from the corresponding isocyanate and phenol, with the possible exception of the p-hydroxyphenyl derivative, in which the hydroxyl group would also be expected to react with the isocyanate. All of the phenyl N-arylcarbamates described in this invention were prepared by the aryl amine-phenyl chloroformate method with the exceptions of p-methoxyphenyl, 4-methyl-m-phenylene, 3,3'-dimethyl-4,4'-biphenylene and methylene bis-(4-phenylene) derivatives which were prepared from the respective isocyanates and phenol.

Although only mono- and di-functional phenyl carbamates are described in this invention, there is every reason to expect tri- and poly-derivatives to be equally applicable.

The process for the production of aryl and arylene carbamylated celluloses comprises wetting the cellulosic material with a 1 to 25 percent by weight solution of a phenyl arylcarbamate in solvent in which the material is soluble, selected from a class of ethyl acetate, dimethylformamide, tetrahydrofuran, dimethylsulfoxide and water, and squeezing the wetted cellulosic material to about a 100 percent wet pickup by using ordinary commercial padding techniques using two dips and two nips. Curing is accomplished by heating the wetted cellulosic material in a forced draft oven at temperatures from about 120° to 250° C. for sufficient times until reaction is complete. The temperature and size of the oven together with the size of sample will dictate the curing times but in general the time will be from about ½ to 6 minutes. In a one-step cure the solvent is removed by evaporation and the cellulosic reaction occurs in a single operation. In a two-step operation the solvent is removed by evaporation separate from the cure by any conventional method and then, at a later time, curing the dry but impregnated cellulosic material at the curing temperature and time. It is not imperative, in order to practice this invention, to wash the treated cellulosic material either with water on an organic solvent, but it is desirable to do so in order to remove traces of unreacted material. All of the times, temperatures and treatments listed above are applicable to the invention but the use of a one-step cure for 4 minutes at 200° C. is preferred.

In those cases where efficiencies were low, the cellulosic material is given a second treatment by repeating the procedure exactly as before using the arylcarbamylated cellulosic material which had been obtained as a result of the first treatment.

Cellulosic materials suitable for use in practicing this invention include cotton, viscose rayon, ramie, jute, and the like cellulosic materials in the form of fabric, yarn, or fiber.

The process of this invention finds particularly valuable utility in two recent developments in the field of cellulosic textiles. In the durable press area, this process can be used successfully by merely impregnating the garment or fabric with a solution of the diphenyl arylenedicarbamate, removing the solvent and completing the garment making process. Final cure of the garment can then be given in the normal manner. The other area of textile finishing in which this process has remarkable utility is in the thermally reversible creasing field because the cross-links possess the ability to impart thermally reversible creases to the cellulosic fabric. The fabric may be treater by the normal process in the flat state, made into a garment by the normal process and, because of this ability to thermally crease wrinkle resistant goods, merely creased with an iron where desired to complete the garment. Another advantage lies in the fact that alterations may be readily accomplished in the finished garment.

The following examples are listed to further explain this invention but in no way are they intended to limit the scope of the invention.

EXAMPLE 1

Phenyl N-(2,4-dimethoxyphenyl) carbamate

To a solution of 15.3 g. (0.1 mole) of 2,4-dimethoxyaniline and 18.1 g. (0.15 mole) of N,N-dimethylaniline, which is utilized as an acceptor for hydrogen chloride, in 150 ml. of dioxane was added dropwise with stirring at room temperature a solution of 15.8 g. (0.1 mole) of phenyl chloroformate in 25 ml. of dioxane. The addition required about 15 minutes after which the reaction mixture was stirred at room temperature for about two hours. The reaction mixture was poured into 500 ml. of 10 percent, by weight, aqueous hydrochloric acid solution followed by stirring of the slurry for 1 hour at room temperature. The solid material was filtered off and the filter cake was washed thoroughly with distilled water until the water washings were free of acidity. The dried precipitate weighed 25.3 g. representing a 92 percent crude yield of phenyl N-(2,4-dimethoxyphenyl)carbamate, from which an analytically pure sample was obtained after three recrystallizations from absolute methanol. The melting point (capillary method) was 130°–131° C. Calcd. for $C_{15}H_{15}NO_4$: C, 65.92; H, 5.53; N, 5.13; molecular weight, 273. Found: C, 66.08; H, 5.65; N. 5.02; molecular weight (osmometric method in acetone), 275. Infrared spectra (KBr disc) exhibited absorptions at 2.94 microns (NH); 5.72 microns (C=O); 6.47 microns (CNH); and 6.16 microns, 6.21 microns and 6.68 microns (phenyl). Nmr spectra in $CDCl_3$ exhibited a chemical shift ($p$ in p.p.m. downfield from TMS), multiplet at 7.43 (aromatic protons) and singlets for the two methoxyls at 3.88 and 3.82. Differential scanning calorimetric determination provided a heat of fusion value of 28.9 cal./g.

EXAMPLE 2

Phenyl N-(3,4,5-trimethoxyphenyl) carbamate

This compound was prepared in the same manner using the same molar quantities as that described for the preparation of phenyl N-(2,4-dimethoxyphenyl)carbamate in example 1, with the exception that the crude yield was 85.8 percent and the melting point was 155.5°–156.5° C. Calcd. for $C_{16}H_{17}NO_2$: C, 63.36; H, 5.65; N, 4.62; molecular weight, 303. Found: C, 63.25; H, 5.80; N, 4.72; molecular weight (osmometric in acetone), 308. Infrared spectra (KBr disc) exhibited absorptions at 2.96 microns (NH); 5.78 microns (C O); 6.50 microns (CNH); and 6.19 microns and 6.66 microns (phenyl). Differential scanning calorimetric determination produced a heat of fusion value of 39.0 cal./g.

EXAMPLE 3

Phenyl N-(3-pyridyl)carbamate

To a well-stirred solution of 15.8 g. (0.1 mole) phenyl chloroformate in 100 ml. dioxane was added dropwise a solution of 9.4 g. (0.1 mole) 3-aminopyridine in 30 ml. dioxane. No added base was used because the compound itself is utilized as its own acid acceptor. After addition of all the solution, the mixture was heated at 80° C. for 3 hours, cooled, and filtered. 22.5 g. of crude phenyl N-(3-pyridyl)carbamate hydrochloride, melting at 295°–298° C. (dec) was recovered representing a crude yield of 90 percent.

An ice-cooled solution of the above solid in 100 ml. of water was made basic by adding dropwise a solution of 30 percent by weight aqueous sodium hydroxide. The resulting tan solid, which was filtered, water washed and dried, weighed 17.8 g. [crude phenyl N-(3-pyridyl)carbamate]representing a crude overall yield of 83 percent. Recrystallization twice from aqueous methanol produced an analytical sample, melting point, 134°–137° C. (dec). Calcd. for $C_{12}H_{10}N_2O_2$: C, 67.29; H, 4.67; N, 13.08; molecular weight, 214. Found: C, 67.09; H, 4.68; N, 13.30; molecular weight (osmometric in ethanol), 212. Infrared spectra (KBr disc) exhibited absorptions at 3.14 microns (NH); 5.74 microns (C=O); 6.42 microns (CNH); 6.19 microns, 6.27 microns, and 6.70 microns (phenyl); and 12.74 microns (characteristic of 3-substituted pyridines). Nmr spectra in $CDCl_3$ exhibited a chemical shift ($\delta$), multiplet at 7.33 (aromatic protons) and a singlet at 9.23 which disappeared on addition of $D_2O$ (NH). Differential scanning calorimetric determination provided a heat of fusion value of 37.5 cal./g.

A yellow crystalline picrate, derivative of phenyl N-(3-pyridyl)carbamate, was prepared by mixing 0.4 g. of the phenyl N-(3-pyridyl)carbamate in 10 ml. 95 percent ethanol with 10 ml. saturated 95 percent ethanol solution of picric acid, filtering and recrystallizing from 95 percent ethanol, melting point, 154° C. (dec). Calcd. for $C_{18}H_{13}N_5O_9$: N, 15.80. Found: N, 15.83.

EXAMPLE 4

Phenyl N-(2-pyridyl)carbamate

Phenyl N-(2-pyridyl) carbamate was prepared in the same manner using the same molar quantities as that described for the preparation of phenyl N-(3-pyridyl)carbamate in example 3 with the exception that the temperatures were maintained at or below 25° C. After a total reaction time of 16 hours, 100 ml. of hexane was added to the reaction mixture throwing out a solid. Crude hygroscopic phenyl N-(2-pyridyl)carbamate hydrochloride was obtained by filtration. Addition of the gummy material to a vigorously stirred, ice-cooled 5 percent aqueous sodium bicarbonate solution yielded a white solid, which was filtered off and dried. Recrystallization from boiling hexane yielded 2.6 g. (12 percent yield) of white needles. One more recrystallization from hexane provided an analytical sample, melting at 161°–162° C. Calcd. for $C_{12}H_{10}N_2O_2$: C, 67.29; H, 4.67; N, 13 molecular weight, 214. Found: C, 67.07; H, 4.61; N, 12.95; molecular weight (osmometric in chloroform), 235. Infrared spectra (KBr disc) exhibited absorptions at 3.12 microns (NH), 5.71 microns (C=O); 6.46 microns (CNH), and 6.18 microns, 6.27 microns and 6.65 microns (phenyl). Nmr spectra in $CDCl_3$ exhibited a total number of 10 protons and a chemical shift ($\delta$), multiplet at 7.25 (aromatic protons). A yellow crystalline picrate, derivative of phenyl N-(-pyridyl)carbamate, -pyridyl)carbamate, was prepared in the same manner as that described for the picrate of phenyl N-(3-pyridyl)carbamate in example 3, melting point, 269°–170° C. (dec). Calcd. for $C_{18}H_{13}N_5O_9$: N, 15.80. Found: N, 15.87.

EXAMPLE 5

Phenyl N-(4-pyridyl)carbamate.

Phenyl N-(4-pyridyl)carbamate was prepared in the same manner as that described for phenyl N-(2-pyridyl)carbamate in example 4 with the exceptions that the dried crude solid, which was obtained after the sodium bicarbonate treatment, contained in addition to product and diphenyl carbonate, a solid which melted at 102°–106° C. (dec). To obtain phenyl N-(4-pyridyl)carbamate, the crude solid obtained above was heated with a large amount (more than 3 liters) of boiling hexane, filtering off the insolubles and concentrating and cooling to obtain 2.0 g. (9 percent yield) of phenyl N-(4-pyridyl)carbamate. Another recrystallization from hexane provided an analytical sample melting at 142°–145° C. Calcd. for $C_{12}H_{10}N_2O_2$: C, 67.29; H, 4.67; N, 13.08; molecular weight, 214. Found: C, 67.13; H, 4.86; N, 12.92; molecular weight (osmometric in chloroform), 220. Infrared spectra (KBr disc) exhibited absorptions at 3.16 microns (NH), 5.68 microns (C=O); 6.48 microns (CNH), and 6.13 microns, 6.26 microns and 6.66 microns (phenyl). Nmr spectra in $CDCl_3$ exhibited a total number of 10 protons and a chemical shift ($\delta$) multiplet at 7.30 for the aromatic protons.

A yellow crystalline picrate, derivative of phenyl N-(4-pyridyl)carbamate, was prepared in the same manner as that described for the picrate for phenyl N-(3-pyridyl)carbamate in example 3, melting point, 175°–177° C. (dec). Calcd. for $C_{18}H_{13}NO_9$: N, 15.80. Found: N, 15.76.

EXAMPLE 6

Phenyl N-(4-diethylaminophenyl)carbamate

To a solution of 16.0 g. (0.1 mole) of phenyl chloroformate in 100 ml. dry dioxane was added, dropwise with vigorous stirring, 14.0 g. (0.1 mole) N,N-diethyl-p-phenylenediamine. The mixture was heated at 90° C. for 1.5 hours to ensure completeness of reaction, cooled, and filtered to obtain crude phenyl N-(4-diethylaminophenyl)carbamate hydrochloride. This solid material was dissolved in 300 ml. water and made basic with the addition of 30 percent sodium hydroxide solution. The precipitate was collected, washed and dried and weighed 25 g. representing a crude yield of 88 percent. Three recrystallizations from methanol water provided an analytical sample melting at 121–122° C. Calcd. for $C_{17}H_{20}N_2O_2$. C, 71.83; H, 7.04; N, 9.86; molecular weight, 284. Found: C, 71.65; H, 6.98; N, 10.03; molecular weight (osmometric in acetone), 280. Infrared spectra (KBr disc) exhibited absorptions at 2.98 microns (NH), 5.72 microns (C=O); )), 5.80 microns (C=O); )), 6.47 microns and 6.57 microns (CNH), and 6.22 microns, 6.27 microns, and 6.66 microns (phenyl). Nmr spectra in $CDCl_3$ exhibited a total number of protons as 20 and a chemical shift, ($\delta$), as follows: Multiplet at 7.25 ($C_6H_5—$), singlet at 6.89 (NH); triplet at 1.10 $[-N(CH_2CH_3)_2$; quadruplet at 3.30 $[-N(CH_2CH_3)_2$. Differential scanning colorimetric determination provided a heat of fusion value of 20.9 cal./g.

A bright yellow crystalline picrate, derivative of phenyl N-(4-diethylaminophenyl)carbamate, was prepared in the same manner as that described in example 3, melting point, 190° C. (dec). Calcd. for $C_{23}H_{23}N_5O_9$: N, 13.65. Found: N, 13.53.

EXAMPLE 7

Phenyl N-(4-dimethylaminophenyl)carbamate

To a solution of 17.3 g. (0.1 mole) of N,N-dimethyl-p-phenylenediamine monohydrochloride in 50 ml. water was added dropwise 30 percent by weight aqueous sodium hydro 30% by weight aqueous sodium hydroxide solution until the reaction mixture was strongly basic. Extraction with 100 ml. of chloroform (using three equal portions) and drying over anhydrous sodium sulfate yielded a chloroform solution of N,N-dimethyl-p-phenylenediamine, which was added dropwise into a solution of 15.7 g. (0.1 mole) phenyl chloroformate in 150 ml. chloroform with stirring and refluxed for 16 hours. After cooling the reaction mixture, the solid phenyl N-(4-dimethylaminophenyl)carbamate hydrochloride was filtered off, dried and recrystallized from acetic acid-benzene solution resulting in an overall yield of 26.1 g. (89 percent) of product melting at 210°–211° C. (dec). To 5 g. of the crude hydrochloride dissolved in 300 ml. of hot 5% HCl solution was added dropwise 30% by weight sodium hydroxide solution until alkaline. The gray gummy mass, which resulted on filtration of the cooled reaction mixture, was recrystallized from methanol-water to yield 2.2 g. of phenyl N-(4-dimethylaminophenyl)carbamate, melting at 153°–155° C. Calcd. for $C_{15}H_{16}N_2O_2$: C, 70.31; H, 6.25; N, 10.94; molecular weight, 256. Found: C, 70.20; H, 6.35; N, 11.09; molecular weight (osometric in ethanol), 260. Infrared spectra exhibited absorptions at 2.98 microns (NH), 5.72 microns and 5.80 microns (C=O); 6.47 microns and 6.57 microns (CNH), and 6.22 microns, 6.27 microns and 6.66 microns (phenyl). Nmr spectra in $CDCl_3$ exhibited a total number of protons as 16, and a chemical shift ($\delta$) as follows: multiplet at 7.25 ($C_6H_5$–); singlet at 6.90 (NH); and singlet at 2.88 $[-N(CH_3)_2]$. Differential scanning calorimetric determination provided a heat of fusion value of 36.0 cal./g.

A bright yellow crystalline picrate was prepared in the same manner as that described in example 3, melting at 181° C. (dec). Calcd. for $C_{21}H_{19}N_5O_9$: N, 14.43. Found: N, 14.30.

EXAMPLE 8

Phenyl N-(2-methyl-4-diethylaminophenyl)carbamate

To a solution of 21.4 g. (0.1 mole) of 2-amino-5-diethylaminotoluene monohydrochloride in 100 ml. dry dioxane was added 10.1 g. (0.1 mole) of triethylamine with stirring at ambient temperatures for four hours. The triethylamine hydrochloride, 17.7 g., melting at 245° C. (dec). was filtered off and to the filtrate was slowly added with stirring a solution of 15.8 g. (0.1 mole) of phenyl chloroformate in 25 ml. dioxane. After three hours of stirring, 30 g. of crude phenyl N-(2-methyl-4-diethylaminophenyl)carbamate hydrochloride, which was soluble in water, methylene chloride, chloroform and acetic acid and insoluble in benzene and Skelly B, was collected, representing a yield of 90 percent. Recrystallization from methylene chloride-Skelly B yielded an analytical sample, melting point, 172°–173° C. Calcd. for $C_{18}H_{23}N_2O_2Cl$: C, 64.57; H, 6.92; N, 8.37; Cl, 10.59; molecular weight, 334, Found: C, 64.42; H, 6.98; N, 8.17; Cl, 10.82; molecular. weight (osmometric in acetone), 330. Infrared spectra exhibited absorptions at 3.16 microns (NH), 4.10 microns (NH), 5.70 microns (C=O); 6.43 microns (CNH) and 6.62 microns (phenyl).

To 3.35 g. (0.01 mole) of pure phenyl N-(2-methyl-4-diethylaminophenyl)carbamate hydrochloride in 9 g. of water heated to about 50° C. was added 0.82 g. (0.01 mole) of solid sodium acetate. A liquid separated out immediately and gradually turned solid on standing. Filtration and drying yielded 2.5 g. (84 percent yield) of the free base melting at 114°–115° C. Recrystallization from Skelly B resulted in an analytical sample, melting point 114.5°–115.5° C. Calcd. for $C_{18}H_{22}NO_2$: C, 72.46; H, 7.43; N, 9.37; molecular weight, 298. Found: C, 72.60; H, 7.50; N, 9.27; molecular weight (osmometric in chloroform), 297. Infrared spectra exhibited absorptions at 3.07 microns (NH), 5.78 microns (C O), 6.57 microns (CNH) and 6.17 microns and 6.66 microns (phenyl). Nmr spectra in $CDCl_3$ exhibited a total number of protons as 22 and a chemical shift ($\delta$) as follows: multiplet at 7.31 ($C_6H_5$ –); singlet at 6.75 (NH); triplet at 1.07 $[-N(CH_2CH_3)_2$; and quadruplet at 3.30 $[-N(CH_2CH_3)_2]$. Differential scanning calorimetric determination provided a heat of fusion value of 28.3 cal./g.

EXAMPLE 9

Phenyl N-(2-dimethylaminophenyl)carbamate

One of the starting materials, N,N-dimethyl-o-phenylenediamine was prepared as follows: 16.6 g. (0.10 mole) o-nitro-N,N-dimethylaniline was shaken in a Parr hydrogenator with 0.2 g. 10% Pd-C catalyst in 150 ml. absolute ethanol for 16 hours absorbing the theoretical amount of hydrogen. Under an atmosphere of argon the catalyst was filtered off and the solvent removed in a rotary evaporator to yield 11.3 g. (82 percent yield) of dark brown oil, presumably N,N-dimethyl-o-phenylenediamine. A solution of this oil in 30 ml. dioxane was slowly added to a stirred solution at 15° C. of 13.3 g. (0.085 mole) phenyl chloroformate in 100 ml. dioxane. Stirring for two hours at room temperature followed by filtration, washing (with Skelly B) and drying yielded 26.6 g. of solid product (91 percent yield) of phenyl N-(2-dimethylaminophenyl)carbamate hydrochloride. Recrystallization from methylene chloride-Skelly B yielded an analytical sample, melting point 145° C. Calcd. for $C_{15}H_{17}N_2O_2Cl$. C, 61.53; H, 5.85; N, 9.56; Cl. 12.11; molecular weight, 292. Found: C, 61.74; H, 6.00; N, 9.70; Cl, 12.13; molecular weight (osmometric in acetone), 280. Infrared spectra exhibited absorptions at 3.13 microns (NH), 4.11 microns NH+), 5.65 microns (C=O); 6.47 microns (CNH), and 6.18 microns and 6.69 microns (phenyl). Nmr spectra in $CDCl_3$ exhibited a chemical shift ($\delta$) as follows: multiplet at 7.77 ($C_6H_5—$) and a singlet at 3.43 $[-N(CH_3)_2]$.

Attempts to prepare the free base, phenyl N-(2-dimethylaminophenyl)carbamate, by adding a strong base to a solution of the above-mentioned hydrochloride yielded only tars.

EXAMPLE 10

Phenyl N-(4-hydroxyphenyl)carbamate

To a solution of 24.0 g. (0.22 mole) of p-hydroxyaniline in 200 ml. anhydrous ether was added dropwise over a 20-minute period a solution of 15.7g. (0.1mole) phenyl chloroformate in 75ml. anhydrous ether, while the temperature was maintained at 30°–35° C. with external cooling. Stirring was continued an additional 5.5 hr. and the solid which had settled out was filtered and transferred to 200 ml. water. The water suspension was extracted with ether and the ether extracts combined with the original ether filtrate. The ether solution was extracted with dilute hydrochloric acid solution, water washed, and dried over sodium sulfate. Evaporation of the ether, after removal of the sodium sulfate, produced an 80 percent crude yield of phenyl N-(4-hydroxyphenyl)carbamate. Several recrystallizations from chloroform produced an analytical sample melting at 152.5°–153.5° C. Calcd. for $C_{13}H_{11}NOB3$: C, 68.16; H, 4.80; N, 6.11; molecular weight, 229. Found: C, 67.96; H, 4.75; N, 6.19; molecular weight (osmometric), 230. Infrared spectra exhibited absorptions at 2.98 microns (NH), 5.77 microns (C 0), 6.50 microns (CNH), and 6.18 microns and 6.65 microns (phenyl). Nmr spectra exhibited a chemical shift ($\delta$) as a singlet at 3.55 (OH).

EXAMPLE 11

Phenyl N-(4-methylthiophenyl)carbamate

To a solution of 13.9 g. (0.1 mole) of p-methylthioaniline and 18.1 g. (0 15 mole) N,N-dimethylaniline in 100 ml. dioxane was added dropwise with mechanical stirring, 15.8 g. (0.1 mole) of phenyl chloroformate in 25 ml. dioxane. The temperature had increased to 50° C. on the addition and the temperature was then raised to 75° C. and stirred for two hours. After cooling, the solution was poured into 100 ml. of 10 percent hydrochloric acid solution. Water was added until no more precipitate was formed. The tan solid was filtered off, water washed and dried producing 20.3 g. of crude phenyl N-(4-methylthiophenyl)carbamate representing a 78 percent yield. Recrystallization several times from methanol-water yielded an analytical sample, melting point 134°–135° C. Calcd. for $C_{14}H_{13}NO_2S$: C, 64.86; H, 5.02; N, 5.41; S, 12.36; molecular weight, 259. Found: C, 64.44; H, 5.07; N, 5.25; S, 12.21; molecular weight (osmometric in ethanol), 254. Infrared spectra exhibited absorptions at 2.98 microns (NH), 5.78 microns (C 0), 6.55 microns (CNH) and 6.30 microns and 6.70 microns (phenyl). Nmr spectra in $CDCl_3$ exhibited a total number of protons as 22 and a chemical shift ($\delta$) as follows: multiplet at 7.25 ($C_6H_5$) and singlet at 2.43 ($CH_3S-$). Differential scanning calorimetric determination provided a heat of fusion value of 26.7 cal./g.

A white crystalline sulfone, derivative of phenyl N-(4-methylthiophenyl)carbamate, was prepared by dissolving 0.8 g. of the thioether in 25 ml. of acetic acid and slowly adding a solution of 0.7 g. potassium permanganate in 25 ml. water until the purple color persists. The purple color due to the permanganate ion was discharged by adding aqueous sodium thiosulfate solution. After cooling, the tan solid was filtered off and recrystallized from methanol-water yielding an analytical sample of phenyl N-(4-methylsulfonylphenyl)carbamate. Calcd. for $C_{14}H_{13}NO_4S$: S, 11.00. Found: S, 10.86. Infrared spectra exhibited an absorption band at 5.70 microns (C=O). Nmr spectra exhibited a chemical shift ($\delta$) as follows: multiplet at 7.25 ($C_6H_5-$) and a singlet at 2.43 ($CH_3SO_2-$).

EXAMPLE 12

Diphenyl N,N'-(4-methoxy-m-phenylene)dicarbamate

To a solution of 21.1 g. (0.1 mole) 4-methoxy-m-phenylenediamine dihydrochloride and 51 ml. (48.4 g., 0.4 mole) of dimethylaniline in 500 ml. of dioxane was added dropwise with stirring, a solution of 31.3 g. (0.2 mole) of phenyl chloroformate in 50 ml. dioxane. The reaction mixture was heated at 70°–80° C. for 16 hours after which it was cooled and poured into 500 ml. of cold 5 percent hydrochloric acid solution. Filtration of the white solid, followed by water washing and drying resulted in 29.0 g. of crude diphenyl N,N'-(4-methoxy-m-phenylene)dicarbamate representing a 77 percent yield. Several recrystallizations of this material from aqueous acetone resulted in an analytical sample, melting point 124.5°–125° C. Calcd. for $C_{21}H_{18}N_2O_5$: C, 66.67; H, 4.76; N, 7.41; molecular weight, 378. Found: C, 66.87; H, 4.90; N, 7.20; Molecular weight (osmometric in chloroform), 371. Infrared spectra exhibited absorption bands at 2.94 microns and 3.02 microns (NH), 5.71 microns and 5.77 microns (C=O); 6.47 Microns (CNH), and 6.13 microns and 6.72 microns (phenyl). Nmr spectra in $CDCl_3$ exhibited a total number of protons as 18 and a chemical shift ($\delta$), as follows: multiplet at 7.35 ($C_6H_5-$) and a singlet at 3.83 ($CH_3O-$). Differential scanning colorimetry provided a heat of fusion value of 23.4 cal./g.

EXAMPLE 13

Diphenyl N,N'-(oxydiphenyl-4,4')dicarbamate

To a solution of 10.0 g. (0.05 mole) of 4-4'-oxydianiline and 13.3 ml. (12.7g., 0.105 mole) of dimethylaniline in 100ml. of dioxane was added dropwise with mechanical stirring a solution of 15.65 g. (0.1 mole) of phenyl chloroformate in 25 ml. of dioxane. After completion of the addition, the reaction mixture was heated to 90° C. for one hour after which it was cooled, and poured into 150 ml. of cold 5 percent aqueous hydrochloric acid solution. The tan precipitate was collected, washed, and dried resulting in 19.2 g. of crude diphenyl N,N'-(oxydiphenyl-4,4')dicarbamate representing a yield of 87 percent. Several recrystallizations of the above produce from aqueous acetone yielded an analytical sample melting point, 208.5°–210° C. Calcd. for $C_{26}H_{20}N_2O_5$: C, 70.91; H, 4.55; N, 6.36; molecular weight, 440. Found: C, 70.96; H, 4.55; N, 6.47; molecular weight (osmometric in acetone), 446. Infrared spectra exhibited absorptions at 3.00 microns (NH), 5.78 microns (C=O); 6.52 microns (CNH) and 6.26 and 6.66 microns (phenyl). Differential scanning calorimetric determinations produced a heat of fusion value of 41.7 cal./g.

EXAMPLE 14

Diphenyl N,N'-(3,3'-dimethoxybiphenylene-4,4') dicarbamate

To a solution of 24.4 g. (0.10 mole) of dianisidine and 24.2 g. (0.20 mole) of dimethylaniline in 200 ml. of dioxane was added dropwise with mechanical stirring a solution of 31.3 g. (0.20 mole) of phenyl chloroformate in 30 ml. dioxane. After completing the addition, the reaction mixture was heated to 95° C. for four hours after which it was cooled and poured into one liter of cold 5 percent hydrochloric acid solution. The white precipitate which was filtered off, washed thoroughly with water and dried, weighed 45.5 g. representing a 94 percent crude yield of diphenyl N,N'-(3,3'-dimethoxybiphenylene-4,4')dicarbamate. Several recrystallizations of this material from acetone produced an analytical sample melting point, 205.5°–207.5° C. Calcd. for $C_{28}H_{24}N_2O_6$: C, 69.41; H, 4.99; N, 5.78; molecular weight, 484. Found: C, 69.62; H, 5.05; N, 5.88; molecular weight (osmometric in chloroform), 480. Infrared spectra exhibited absorption bands at 2.89 microns (NH), 5.69 microns (C=O); 6.56 microns (CNH), and 6.17 microns, 6.27 microns and 6.73 microns (phenyl). Nmr spectra in $CDCl_3$ exhibited a total number of protons as 24 and a chemical shift ($\delta$), as a singlet at 4.03 ($CH_3O-$). Differential scanning calorimetry provided a heat of fusion vale of 39.3 cal./g.

EXAMPLE 15

Diphenyl N,N'-(4-dimethylamino-m-phenylene)dicarbamate

A solution of 21.1 g. (0.1 mole) of 2,4-dinitro-N,N-dimethylaniline in 300 ml. of absolute methanol to which 0.20 g of 10 percent Pd-C was added was hydrogenated in a Parr shaking apparatus until theoretical hydrogen uptake was recorded (ca 16 hours) The catalyst was filtered off and the methanol removed under reduced pressure. A solution of the residue and 12.1 g. (0.01 mole) of dimethylaniline in 60 ml. of dioxane was added dropwise with stirring to a hot (70° C.) solution of 31.3 g. (0.20 mole) of phenyl chloroformate in 300 ml. dioxane. Stirring was continued for 2.5 hours after which the solvent was removed with a rotary evaporator. The brown tarry residue was then vigorously shaken with a solution of 10.1 g. (0.10 mole) of triethylamine in 300 ml. benzene. Filtration of the cooled mixture resulted in a 93 percent yield of crude triethylamine hydrochloride The benzene was removed from the filtrate leaving a brown tar which did not crystallize on standing. The tar was subjected to several extractions of hot Skelly B producing on cooling solid diphenyl N,N'-(4-dimethylamino-m-phenylene)dicarbamate which was collected by filtration and weighed 4.7 g. representing a yield of 12 percent. Several recrystallizations of this material from Skelly B produced an analytical sample, melting point, 112°–113.5° C. Calcd. for $C_{22}H_{21}N_3O_4$: C, 67.52; H, 5.37. N. 10.74; molecular weight, 391. Found: C, 67.37; H, 5.52, N. 10.94; molecular weight (osmometric in chloroform), 385 Infrared spectra exhibited absorption bands at 2.92 microns and 2.98 microns (NH), 5.66 microns and 5.70 microns (C=O), 6.55 microns (CNH) and 6.26 microns and 6.70 microns (phenyl). Nmr spectra in $CDCl_3$ exhibited a total number of protons as 21 and a chemical shift ($\epsilon$) as a singlet at 2.60 [—$N(CH_3)_2$]. Different scanning calorimetry provided a heat of fusion value of 21.6 cal./g.

EXAMPLE 16

A sample of cotton printcloth, which had been desized, scoured, and bleached, was preswelled by immersing in a 0.1 percent aqueous solution of Triton X-100 wetting agent at room temperature for 16 hours. The water was removed from the sample by washing with four changes of dry DMF and padded at a tight squeeze to contain approximately one part by weight of DMF per one part by weight of sample. The sample was immersed for 15 minutes in a solution containing sufficient phenyl N-(4-methoxyphenyl)carbamate and DMF to ensure a final overall solution concentration of 10 parts by weight of carbamate in 40 parts by weight of DMF. The excess solution was removed by padding at least two dips and two nips at a tight squeeze so that the fabric contained approximately one part by weight of solution per one part by weight of fabric. The sample was then dried in a forced draft oven at 80° C. for 30 minutes and cured at 200° C. for 4 minutes. Unreacted carbamate was removed by extracting with hot DMF for at least 15 minutes and rinsing in cold DMF; the sample was then washed with water to remove DMF and air-dried.

The N-(4-methoxyphenyl)carbamylated cotton printcloth has a weight add-on of 2.8 percent, a nitrogen content of 0.38 percent, and a moisture content of 3.91 percent. The efficiency of the treatment calculated from the add-on and the theoretical amount of reaction possible based on the wet pickup and padding solution concentration was 31.9 percent.

A white fabric prepared by a similar method had a 3.1 percent add-on, 0.4 percent nitrogen, 3.29 percent moisture, a 27 percent reaction efficiency and resisted deterioration in a standard soil-burial test for 24 days (compared to 5 days for the untreated cotton fabric).

The conditions of the treatment were varied in respect to curing times, curing temperatures and preswelling agents.

EXAMPLE 17

A sample of cotton print cloth was treated with phenyl N-(2,4-dimethoxyphenyl)carbamate as in example 16 except that the drying after padding was omitted and curing was extended to 6 minutes at 170°–190° C.

TABLE 1.—CONDITIONS FOR REACTION OF PHENYL N-(4-METHOXYPHENYL)CARBAMATE WITH COTTON PRINTCLOTH

| Preswelling agent | Curing Temp. °C | Time, min | Percent Add-on | Nitrogen | Moisture | Efficiency |
|---|---|---|---|---|---|---|
| Water [1] | 120 | 4.0 | 0.0 | 0.06 | 4.33 | 4.3 |
| Do | 160 | 4.0 | 0.7 | 0.13 | 4.32 | 10.6 |
| Do | 200 | 2.0 | 2.8 | 0.33 | 4.65 | 27.7 |
| Do | 200 | 4.0 | 2.8 | 0.38 | 3.91 | 31.9 |
| DMF | 120 | 4.0 | 0.7 | 0.03 | 4.50 | 2.1 |
| DMF | 160 | 4.0 | 1.4 | 0.13 | 4.69 | 10.6 |
| DMF | 200 | 0.5 | 0.7 | 0.10 | 4.72 | 8.5 |
| DMF | 200 | 1.0 | 2.1 | 0.34 | 4.85 | 28.4 |
| DMF | 200 | 2.0 | 2.8 | 0.35 | 4.62 | 29.1 |
| DMF | 200 | 4.0 | 2.8 | 0.38 | 4.22 | 31.9 |

[1] Containing 0.1% by weight of Triton X-100 wetting agent.

The N-(2,4-dimethoxyphenyl)carbamylated cotton print cloth had a weight add-on of 3.3 percent, a nitrogen content of 0.30 percent, and a moisture content of 2.90 percent. The reaction efficiency was 28 percent. The white fabric resisted deterioration in a standard soil-burial test for 31 days compared to 5 days for the control.

EXAMPLE 18

A sample of cotton print cloth was treated with phenylN-(3,4,5-trimethoxyphenyl)carbamate as in example 16 except that the drying after padding was omitted and the curing conditions were 200° C. for 4 minutes. The N-(3,4,5-trimethoxyphenyl)carbamylated cotton print cloth had a weight add-on of 7.1 percent, a nitrogen content of 0.51 percent, and a moisture content of 3.64 percent. The reaction efficiency was 44 percent. The white fabric resisted deterioration in a standard soil-burial test for 17 days compared to 5 days for the control.

EXAMPLE 19

A sample of cotton print cloth was treated with phenyl N-(3-pyridyl)carbamate as in example 18 except that the sample containing about 100 percent wet pickup of DMF after exchanging was padded through a sufficient amount of 20 percent by weight solution of the carbamate in DMF so that the resulting solution concentration became 18.2 percent by weight.

The N-(3-pyridyl)carbamylated cotton had a weight add-on of 7.7 percent, a nitrogen content of 1.78 percent, and a moisture content of 4.04 percent. The light yellow fabric had not deteriorated in a standard soil burial test after 89 days compared to 5 days for the control. It dyed a very dark red in the acid dye Kiton Fast Red indicating the presence of appreciable basic nitrogen. The ion exchange capacity was determined to be 0.13 meq./g. by soaking the sample overnight in 5 percent aqueous hydrochloric acid, washing with conductivity water until the wash water contained no more chloride ion, drying, analyzing for chlorine, and calculating the equivalent of basic nitrogen originally present; the untreated fabric was found to have less than 0.003 meq./g.

EXAMPLE 20

A sample of cotton print cloth was treated with phenyl N-(2-pyridyl)carbamate as in example 18. The N-(2-pyridyl)-carbamylated cotton fabric had a 5.0 percent weight add-on, a nitrogen content of 1.68 percent, and a moisture content of 3.48 percent. The light yellow fabric resisted deterioration in a standard soil burial test for 24 days compared to 5 days for the untreated fabric. It dyed a maroon color with Kiton Fast Red dye indicating the presence of appreciable basic nitrogen. The ion exchange capacity, determined as in example 19, was found to be 0.08 meq./g. compared with less that 0.003 meq./g. for untreated cotton.

EXAMPLE 21

A sample of cotton print cloth was treated with phenyl N-(4-pyridyl)carbamate as in example 18 The N-(4-pyridyl)carbamylated cotton fabric has a weight add-on of 6.3 percent, a nitrogen content of 1.56 percent, and a moisture content of 7.43 percent. The light brown fabric resisted deterioration in a standard soil burial test for 52 days compared to 5 for the untreated control. It dyed very dark red with Kiton Fast Red indicating the presence of appreciable basic nitrogen. The ion exchange capacity, determined as in Example 19, was found to be 0.06 meq./g. compared with less than 0.003 meq./g. for untreated cotton.

EXAMPLE 22

A sample of cotton print cloth was treated with phenyl N-(4-diethylaminophenyl)carbamate as in example 18 except that the sample containing about 100 percent wet pickup of DMF after exchanging was padded through a sufficient amount of a 20 percent by weight solution of the carbamate in DMF so that the resulting solution concentration became 18.7 percent by weight and the curing was at 180° C. for 5 minutes. The N-(4-diethylaminophenyl)carbamylated cotton fabric had a weight add-on of 5.2 percent, and to obtain a greater add-on the treatment was repeated except that the resulting solution concentration was 17.9 percent and the curing was at 200° C for 4 minutes. The doubly treated N-(4-diethylaminophenyl)-carbamylated cotton fabric had an overall weight add-on of 8.3 percent and a nitrogen content of 1.36 percent. The light brown fabric had not deteriorated in a standard soil burial test after 89 days compared to 5 days for the untreated control It dyed dark red with Kiton Fast Red indicating the presence of appreciable basic nitrogen. The ion exchange capacity, determined as in example 19, was found to be 0.10 meq./g. compared with less than 0.003 meq./g. for untreated cotton.

EXAMPLE 23

A sample of cotton pring cloth was doubly treated with phenyl N-(4-dimethylaminophenyl)carbamate as in example 22 except that the resulting carbamate solution concentrations were 18.6 percent by weight in the first treatment and 18.5 percent by weight in the second treatment. The doubly treated N-(4-diethylaminophenyl)carbamylated cotton fabric had an overall weight add-on of 6.8 percent and a nitrogen content of 1.29 percent. The light brown fabric resisted deterioration in a standard soil burial test for 17 days compared to 5 days for the untreated control fabric It dyed dark red with Kiton Fast Red dye indicating the presence of appreciable basic nitrogen. The ion exchange capacity, determined as in example 19, was found to be 0.07 meq./g. compared with less than 0.003 meq./g. for untreated cotton

EXAMPLE 24

A sample of cotton print cloth was treated with phenyl N-(2-methyl-4-diethylaminophenyl)carbamate as in example 18 The N-(2-methyl-4-diethylaminophenyl)carbamylated cotton fabric had a weight add-on of 2.6 percent, a nitrogen content of 0.65 percent, and a moisture content of 1.78 percent. The tan-colored fabric resisted deterioration in a standard soil burial test for 17 days, compared to 5 days for the untreated control fabric. It dyed maroon with Kiton Fast Red dye indicating the presence of appreciable basic nitrogen. The ion exchange capacity, determined as in example 19, was found to be 0.06 meq./g. compared with less than 0.003 meq./g. for untreated cotton.

EXAMPLE 25

A sample of cotton print cloth was treated with phenyl N-(2-methyl-4-diethylaminophenyl)carbamate hydrochloride by preswelling the fabric in 0.1 percent aqueous Triton X—100 solution as in example 16 and padded to about 100% wet pickup of preswelling solution. It was padded with a solution of sufficient phenyl N-(2-methyl-4-diethylaminophenyl)carbamate hydrochloride in water to result in a 20 percent by weight solution. The wetted sample was dried in a forced draft oven at 75° C. for 7 minutes and then immersed in a solution of 10 percent by weight of sodium hydroxide in water for about 2 minutes to convert the carbamate hydrochloride to the free base. The fabric was washed briefly with three changes of distilled water, blotted free of excess water with towels, and cured at 170°–190° C. for 6 minutes. The cured sample was washed in hot DMF and then water to remove the excess DMF and air-dried. The N-(2-methyl-4-diethylaminophenyl)carbamylated cotton fabric had no measurable weight add-on, but had a nitrogen content of 0.29 percent and a moisture content of 2.32 percent. The white fabric resisted deterioration in a standard soil burial test for 10 days compared to 5 days for the untreated control cotton fabric. It dyed medium red with Kiton Fast Red dye indicating the presence of basic nitrogen. The ion exchange capacity, determined as in example 19, was found to be 0.03 meq./g. compared with less than 0.003 meq./g. for untreated cotton.

EXAMPLE 26

A sample of cotton print cloth was treated with phenyl N-(2-dimethylaminophenyl)carbamate hydrochloride as in example 25. The N-(2-dimethylaminophenyl)carbamylated cotton fabric had no measurable weight add-on, but had a nitrogen content of 0.25 percent and a moisture content of 4.39 percent. The light brown fabric resisted deterioration in a standard soil burial test for 10 days compared to 5 days for the untreated control cotton. It dyed medium red with Kiton Fast Red dye indicating the presence of basic nitrogen. The ion exchange capacity, determined as in example 19, was found to be 0.03 meq./g. compared with less than 0.003 meg./g. for untreated cotton.

EXAMPLE 27

A sample of cotton print cloth was treated with phenyl N-(4-hydroxyphenyl)carbamate, as follows: The fabric sample was preswelled in water for 2 hours and exchanged with ethyl alcohol followed by two changes of ethyl acetate. The anhydrous ethyl acetate-containing fabric was immersed in a solution of one gram of phenyl N-(4-hydroxyphenyl)-carbamate dissolved in 4.5 g. ethyl acetate in a flat pan making a final solution concentration by weight of about 12 percent. After a slight amount of agitation of the solution to equilibrate the fabric and solution, the pan was placed in a forced draft oven at 250° C. for 5 minutes. The sample was washed in hot DMF and water and air-dried. The N-(4-hydroxyphenyl)carbamylated cotton fabric had an 8.7 percent weight add-on, a nitrogen content of 0.81 percent, and a moisture content of 3.66 percent. The brown colored fabric resisted deterioration in a standard soil burial test for 52 days compared to 5 days for the untreated cotton control fabric.

EXAMPLE 28

A sample of cotton print cloth was treated with phenyl N-(4-methylthiophenyl)carbamate as in example 18 except that the overall solution concentration was 16.1 percent by weight. The N-(4-methylthiophenyl)carbamylated fabric had a weight add-on of 6.2 percent, a nitrogen content of 0.65 percent, and a moisture content of 3.56 percent. The very pale yellow fabric had not deteriorated after 89 days in a standard soil burial test, compared with 5 days for the control.

EXAMPLE 29

A sample of cotton print cloth was treated with diphenyl N,N'-(4-methoxy-m-phenylene)dicarbamate. The fabric was preswelled in 0.1 percent Triton X-100 in water and exchanged with tetrahydrofuran and padded to about 30% by weight wet pickup of tetrahydrofuran. The sample was padded two dips and two nips with a solution of sufficient diphenyl N,N'-(4-methoxy-m-phenylene)dicarbamate in tetrahydrofuran to result in an overall solution concentration of 24.3 percent and to a wet pickup of **percent. The fabric was dried at 85° C for 5 minutes and cured at 180° C. for 4 minutes. It was washed in DMF and water and air-dried. The fabric had a weight add-on of 0.6 percent. To increase the add-on, the N,N'-(4-methoxy-m-phenylene)dicarbamylated cotton fabric prepared above was treated a second time as follows: The fabric sample was preswelled in 0.1 percent Triton X–100 by weight in water for 10 minutes and solvent exchanged with DMF to a wet weight pickup of about 100 percent. It was padded with a solution of sufficient diphenyl N,N'-(4-methoxy-m-phenylene)dicarbamate in DMF to result in an overall concentration of 23.5 percent by weight to a 93 percent wet pickup. It was cured at 180° C. for 6 minutes, extracted with hot DMF, washed with distilled water, and air-dried. The doubly treated N,N'-(4-methoxy-m-phenylene)dicarbamylated cotton fabric had an overall weight add-on of 4.2 percent, a nitrogen content of 0.62 percent, and a moisture content of 2.44 percent. The tan fabric had not deteriorated in a standard soil burial test after 89 days, compared to 5 days for the control. The Monsanto crease recovery angles were 241° (W+F), dry, and 248° (W+F), wet, compared with 130° (W+F), dry and 124° (W+F), wet for the untreated cotton.

Crease insertion and removal using a hot iron was used to indicate breaking and reforming of cross-links as follows: A 6-inch (warp) by 2-inch (fill) sample of treated fabric was wet in 0.1 percent by weight aqueous Triton X–100 wetting agent and creased in the middle along the warp direction with an iron at the linen setting (185°–210° C.) for one minute. The AATCC crease rating was 5 (indicating a very sharp crease) compared to a rating of 5 for the untreated control. A good resistance to crease removal by laundering was shown by a crease rating of 4 after 10 washing cycles in a drum-type automatic washer followed by air drying. The untreated control sample laundered in the same way had a crease rating of 2 (indicating practically no crease). Another sample which was creased as described above was wet with 0.1 percent aqueous Triton X–100 and the crease was ironed flat at the linen setting for one minute. It had a crease rating of 3.5 compared to 2.5 for an untreated control sample which was creased and ironed flat in the same way. When both of these samples were given the 10 washing cycle treatment, the crease rating was 4 for the treated sample compared to 2.5 for the untreated sample.

EXAMPLE 30

A sample of cotton print cloth was treated with diphenyl N,N'-(oxydiphenyl-4,4') dicarbamate. It was preswelled in 0.1 percent Triton X–100 by weight in water and exchanged with several changes of DMF to a DMF pickup of 87 percent. It was padded two dips and two nips with a solution of sufficient diphenyl N,N—(oxydiphenyl-4,4') dicarbamate in DMF to result in an overall solution concentration of 23.3 percent by weight and to a wet pickup of 87 percent. The fabric was cured at 180° C. for 6 minutes, extracted with hot DMF, washed in distilled water, and air-dried. The N,N'-(oxydiphenyl-4,4') dicarbamylated cotton fabric had a weight add-on of 6.4 percent, a nitrogen content of 0.69 percent, and a moisture content of 2.51 percent. The reaction efficiency, assuming reaction of both carbamate groups of diphenyl N,N'-(oxydiphenyl-4,4')-dicarbamate, was 64 percent. The ten fabric had not deteriorated in a standard soil burial test after 89 days compared to 5 days for the control fabric. The Monsanto crease recovery angles were 264° (W+F), dry, and 272° (W+F), wet, compared with 130° (W+F), dry and 124° (W+F), wet for untreated cotton.

A crease inserted by ironing as in example 29 had an AATCC crease rating of 4.5 which was lowered to 2.5 by 10 washing cycles compared to 5 and 2, respectively, for the untreated control. A creased sample which was ironed flat had a rating 3, and 3.5 after 10 washing cycles compared to 2.5 in both cases for the untreated control.

EXAMPLE 31

A sample of cotton print cloth was treated with dephenyl N,N'-(3,3'-dimethoxy-biphenylene-4,4') dicarbamate by preswelling the untreated fabric with 0.1 percent Triton X–100 by weight in water and exchanged with DMF to a DMF pickup of 107 percent. It was padded two dips two nips with a solution of sufficient diphenyl N,N'-(3,3'-dimethoxybiphenylene-4,4')dicarbamate in DMF to result in an overall solution concentration of 7.6 percent and to a wet pickup of 119 percent. The fabric was cured at 200° C for 4 minutes, extracted with hot DMF, water-washed, and air-dried. The N,N'-(3,3'-dimethoxybiphenylene-4,4') dicarbamylated cotton fabric had a weight add-on of 2.1 percent, a nitrogen content of 0.35 percent, and a moisture content of 1.78 percent. The reaction efficiency was 38 percent. The light tan fabric resisted deterioration in a standard soil burial test for 52 days compared to 5 days for the control. The Monsanto crease recovery angles were 165° (W+F), dry and 224° (W+F), wet compared to 130° (W+F), dry, and 124° (W+F), wet, for the untreated cotton.

EXAMPLE 32

A sample of cotton print cloth was treated with diphenyl N,N'-(3,3'-dimethoxybiphenylene-4,4') dicarbamate by the method of example 31 with the following exceptions: After preswelling the sample was exchanged with DMSO to a pickup of 120° percent, then padded with a warm (to increase solubility) solution of sufficient dicarbamate in DMSO to result in an overall concentration of 17.1 percent, to a wet pickup of 149 percent, and extraction was with DMSO rather than DMF. The N,N'-(3,3'-dimethoxybiphenylene-4,4') dicarbamylated cotton fabric had a weight add-on of 9.6 percent, a nitrogen content of 0.96 percent, and a moisture content of 2.45 percent. The reaction efficiency was 61 percent. The tan fabric had Monsanto crease recovery angles of 243° (W+F), dry and 256° (W+F), wet compared with 172° (W+F), dry and 138° (W+F), wet, for the untreated fabric. It had a warp strip breaking strength of 30.5 lb. with 6.7 percent elongation at break compared to 47.8 lb. and 8.3 percent, respectively, for the untreated fabric. It also possessed a warp flex abrasion resistance of 170 cycles compared to 602 cycles for the untreated fabric.

EXAMPLE 33

A sample of cotton print cloth was treated with diphenyl N,N'-(3,3'-dimethoxybiphenylene-4,4')dicarbamate by the method of Example 32 with the following exceptions: The pickup of DMSO after exchanging was 133 percent, and a warm solution of sufficient dicarbamate in DMSO to result in an overall concentration of 16.7 percent and was padded to 133 percent wet pickup. The N,N'-(3,3'-dimethoxybiphenylene-4,4')dicarbamylated cotton fabric had a weight add-on of 10.3 percent, a nitrogen content of 0.94 percent, and a moisture content of 1.99 percent. The reaction efficiency was 76 percent. The light tan fabric had not deteriorated in a standard soil burial test after 89 days compared to 5 days for the control. The Monsanto crease recovery angles were 195° (W+F), dry, and 124° (W+F), wet, compared with 130° (W+F), wet, for the untreated fabric.

A crease inserted by ironing as in example 29 had an AATCC crease rating of 5 which was lowered to 4 by 10 washing cycles compared to 5 and 2, respectively, for the untreated control. A creased sample which was ironed flat had a rating of 4 and 3 (after 10 washing cycles) compared with 2.5 in both cases for the untreated control.

EXAMPLE 34

A sample of cotton print cloth was treated with diphenyl N,N'-(4-dimethylamino-m-phenylene)dicarbamate by the method of example 31 with the following exceptions: The pickup of DMF after exchanging was 100 percent, the sample was padded with a solution of sufficient diphenyl N,N'-(4- dimethylamino-m-phenylene)dicarbamate in DMF to result in an overall concentration of 20 percent to a wet pickup of 100 percent. The N,N'-(4-dimethylanimo-m-phenylene)dicarbamylated cotton fabric had a weight add-on of 6.1 percent, a nitrogen content of 1.44 percent, and a moisture content of 3.83 percent. The reaction efficiency was 59 percent. The light brown fabric had not deteriorated in a standard soil burial test after 89 days compared to 5 days for the control cotton fabric. It dyed a medium red color with Kiton Fast Red dye indicating the presence of appreciable basic nitrogen. The warp dry Monsanto crease recovery angle was 108° compared with 66° for the untreated cotton.

EXAMPLE 35

A sample of cotton print cloth was treated with diphenyl N,N'-(4-dimethylamino-m-phenylene)dicarbamate by the method of example 32 with the following exceptions: The pickup of DMSO after exchanging was 108 percent, the sample was padded with a solution of sufficient diphenyl N,N'-(4-dimethylamino-m-phenylene)dicarbamate in DMSO to result in an overall concentration of 20 percent to a wet pickup of 140 percent. The N,N'-(4-dimethylamino-m-phenylene)dicarbamylated cotton fabric had an add-on of 10.0 percent, a nitrogen content of 2.21 percent, and a moisture content of 1.99 percent. The reaction efficiency was 69 percent. The light brown fabric had not deteriorated in a standard soil burial test after 89 days compared to 5 days for the untreated control. It dyed a medium red color with Kiton Fast Red indicating the presence of appreciable basic nitrogen. The ion exchange capacity was found to be 0.09 meq./g. compared with less than 0.003 meg./g. for untreated fabric. The Monsanto crease recovery angles were 229° (W+F), dry, and 252° (W+F), wet, compared with 130° (W+F), dry, and 124° (W+F), wet, for the untreated fabric.

EXAMPLE 36

A sample of cotton print cloth was treated with diphenyl N,N'-(4-dimethylamino-m-phenylene)dicarbamate by the method of example 32 with the following exceptions: The pickup of DMSO after exchanging was 121 percent, the sample was padded with a warm solution of sufficient diphenyl N,N'-(4-dimethylamino-m-phenylene)dicarbamate in DMSO to result in an overall concentration of 20 percent to a wet pickup of 123 percent. The N,N'-(4-dimethylamino-m-phenylene)dicarbamylated cotton fabric had a weight add-on of 9.3 percent, a nitrogen content of 2.21 percent, and a moisture content of 3.64 percent. The reaction efficiency was 73 percent. The light brown fabric had Monsanto crease recovery angles of 247° (W+F), dry, and 257° (W+F), wet, compared to 172° (W+F), dry, and 133° (W+F), wet, for the untreated fabric, the warp strip breaking strength was 33.7 lb. and the elongation at break was 7.0 percent compared with 47.8 lb. and 8.3 percent, respectively, for the untreated fabric, and the warp flex abrasion resistance was 98 cycles compared with 602 cycles for the untreated fabric.

A crease inserted by ironing as in example 29 had an AATCC rating of 5 which was lowered to 3 by 10 washing cycles compared to 5 and 2, respectively, for the untreated control. A creased sample which was ironed flat had a rating of 2.5 and 2 after 10 washing cycles compared with 2.5 in both cases for the untreated control.

EXAMPLE 37

A sample of cotton print cloth was treated 29 diphenyl N,N'-(p-phenylene)dicarbamate by preswelling the fabric with aqueous 0.1 percent Triton X–100 solution and exchanged as in example 29 to a 91 percent pickup of DMF. It was padded four dips and four nips with a warm solution of sufficient diphenyl N,N'-(p-phenylene)dicarbamate in DMF to result in an overall solution concentration of 18.1 percent to a wet pickup of 94 percent. The wet fabric was dried in a forced draft oven at 160° for 3 minutes, ironed at 150°–165° C., and cured at 174°–184° C for 5 minutes. It was extracted with hot DMF, water-washed, and air-dried. The weight add on was 2.8 percent.

The fabric was treated a second time with diphenyl N,N'-(p-phenylene)dicarbamate by steeping in a 4.8 percent solution in DMF in a pan covered with aluminum foil in a forced draft oven at 150° C. for 30 minutes. The dry fabric was extracted with hot DMF, water-washed, and air-dried. The doubly N,N'-(p-phenylene)dicarbamylated fabric had an overall weight add-on of 6.4 percent and a nitrogen content of 0.75 percent. The Monsanto crease recovery angles were 249° (W+F), dry, and 263° (W+F), wet, compared with 130° (W+F), dry, and 124° (W+F), wet, for the untreated fabric. The white fabric had not deteriorated after 89 days in a standard soil burial test compared to 5 days for the untreated control.

A crease inserted by ironing as in example 29 had an AATCC crease rating of 5 which was lowered to 3 by 10 washing cycles compared to 5 and 2, respectively, for the untreated control. A creased sample which was ironed flat had a rating of 3, and 2.5 after 10 washing cycles compared with 2.5 in both cases for the untreated control.

EXAMPLE 39

A sample of cotton print cloth was treated with diphenyl N,N'-(4-methyl-m-phenylene)dicarbamate. It was padded two dips and two nips with a 20 percent by weight solution of diphenyl N,N'-(4-methyl-m-phenylene)dicarbamate in DMSO to a wet pickup of 135 percent. The wet fabric was cured at 200° C. for 4 minutes, extracted with hot DMSO, water-washed, and air-dried. The N,N'-(4-methyl-m-phenylene)dicarbamylated cotton fabric had a weight add-on of 10.4 percent, a nitrogen content of 1.39 percent, and a moisture content of 4.80 percent. The reaction efficiency was 80 percent. The light tan fabric had Monsanto crease recovery angles of 247° (W+F), dry, and 255° (W+F), wet, compared to 172° (W+F), dry, and 138° (W+F), wet, for the untreated cotton. It possessed a warp strip breaking strength of 41.8 lb. compared with 47.8 lb. for the untreated fabric, and a warp Elmendorf tearing strength of 493 g. compared to 1,100 g. for the untreated fabric.

A crease inserted as in example 29 had an AATCC crease rating of 4.5 which was lowered to 2.5 by 10 washing cycles compared to 5 and 2, respectively, for an untreated control. A creased sample which was ironed flat had a rating of 2.5 and 1 after 10 washing cycles compared to 2.5 in both cases for an untreated control.

EXAMPLE 39

A sample of cotton print cloth was treated with diphenyl N,N'-(3,3'-dimethylbiphenylene-4,4')dicarbamate as in example 38. An exception was that the wet pickup was 129. The N,N'-(3,3'-dimethylbiphenylene-4,4') dicarbamylated cotton had a weight add-on of 7.6 percent, a nitrogen content of 0.61 percent, and a moisture content of 4.62 percent. The reaction efficiency was 53 percent. The pale yellow fabric had Monsanto crease recovery angles of 224° (W+F), dry, and 221° (W+F), wet compared to 172° (W+F), dry, and 138° (W+F), wet for the untreated cotton. It possessed a warp strip breaking strength of 49.4 lb. compared with 47.3 lb. for the untreated fabric, and a warp Elmendorf tearing strength of 693 g. compared to 1,100 g. for the untreated fabric.

A crease inserted as in example 29 had an AATCC crease rating of 5 which was lowered to 3.5 by 10 washing cycles compared to 5 and 2, respectively, for an untreated control. A creased sample which was ironed flat had a rating of 3.5 and 2 after 10 washing cycles compared to 2.5 in both cases for an untreated control.

EXAMPLE 40

A sample of cotton print cloth was treated with diphenyl N,N'-[methylene bis-(4-phenylene)] dicarbamate as in example 38. An exception was that of a wet pickup of 134 percent.

The N,N'-[methylene-bis-(4-phenylene)]dicarbamylated cotton had a weight add-on of 9.1 percent a nitrogen content of 0.84 percent, and a moisture content of 4.36 percent. The reaction efficiency was 58 percent. The very pale yellow fabric had Monsanto crease recovery angles of 280° (W+F), dry, and 278° (W+F), wet, for the untreated control. It possessed a warp strip breaking strength of 43.8 lb. compared with 47.8 lb. for the untreated fabric, and a warp Elmendorf tearing strength of 593 g. compared to 1,100 g. for the untreated fabric.

A crease inserted as in example 29 had an AATCC crease rating of 3.5 which was lowered to 1.5 by 10 washing cycles, compared to 5 and 2, respectively, for an untreated control. A creased sample which was ironed flat had a rating of 2 which was lowered to one by 10 washing cycles, compared to 2.5 in both cases for an untreated fabric.

We claim:

1. A process for preparing 11-substituted carbamates of cellulose which process comprises wetting a cellulosic textile material with a solution containing about from 1 to 25 weight percent of a phenyl N-substituted carbamate
  selected from the group consisting of:
  Phenyl N-(2,4-dimethoxyphenyl)carbamate,
  Phenyl N-(3,4,5-trimethoxyphenyl)carbamate,
  Phenyl N-(3-pyridyl)carbamate,
  Phenyl N-(2-pyridyl)carbamate,
  Phenyl N-(4-pyridyl)carbamate,
  Phenyl N-(4-dimethylaminophenyl)carbamate,
  Phenyl N-(2-methyl-4-diethylaminophenyl)carbamate,
  Phenyl N-(2-dimethylaminophenyl) carbamate hydrochloride,
  Phenyl N-(4-methylthiophenyl)carbamate,
  Phenyl N,N'-(4-methoxy-m-phenylene)dicarbamate,
  Diphenyl N,N'-(oxydiphenyl-4,4')dicarbamate,
  Diphenyl N,N'-(4-dimethylamino-m-phenylene)dicarbamate, and
  Phenyl N-(4-hydroxyphenyl)carbamate. and subsequently heating the wetted cellulosic material at a temperature of about from 120° to 250° C. until the reaction product phenol is expelled.

2. The textile material produced by the process of claim 1 using phenyl N-(2,4-dimethoxyphenyl)carbamate.

3. The textile material produced by the process of claim 1 using phenyl N-(3,4,5-trimethoxyphenyl)carbamate.

4. The textile material produced by the process of claim 1 using phenyl N-(3-pyridyl)carbamate.

5. The textile material produced by the process of claim 1 using phenyl N-(2-pyridyl)carbamate.

6. The textile material produced by the process of claim 1 using phenyl N-(4-pyridyl)carbamate.

7. The textile material produced by the process of claim 1 using phenyl N-(4-dimethylaminophenyl)carbamate.

8. The textile material produced by the process of claim 1 using phenyl N-(2-methyl-4-diethylaminophenyl)carbamate.

9. The textile material produced by the process of claim 1 using phenyl N-(2-dimethylaminophenyl)carbamate hydrochloride.

10. The textile material produced by the process of claim 1 using phenyl N(4-methylthiophenyl)carbamate.

11. The textile material produced by the process of claim 1 using phenyl N,N'-(4-methoxy-m-phenylene)dicarbamate.

12. The textile material produced by the process of claim 1 using diphenyl N,N'-(oxydiphenyl-4,4') dicarbamate.

13. The textile material produced by the process of claim 1 using diphenyl N,N'-(4-dimethylamino-m-phenylene)dicarbamate.

* * * * *